United States Patent
Deville et al.

(10) Patent No.: US 12,480,032 B2
(45) Date of Patent: Nov. 25, 2025

(54) WELLBORE STABILITY COMPOSITIONS COMPRISING NANOPARTICLES

(71) Applicant: Halliburton Energy Services, Inc., Houston, TX (US)

(72) Inventors: Jay Deville, Houston, TX (US); Preston May, Houston, TX (US); Jeffrey J. Miller, Houston, TX (US); William W. Shumway, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 203 days.

(21) Appl. No.: 17/557,950

(22) Filed: Dec. 21, 2021

(65) Prior Publication Data

US 2023/0203361 A1 Jun. 29, 2023

(51) Int. Cl.
*C09K 8/504* (2006.01)
*C09K 8/508* (2006.01)
*C09K 8/516* (2006.01)

(52) U.S. Cl.
CPC .......... *C09K 8/5045* (2013.01); *C09K 8/5083* (2013.01); *C09K 8/516* (2013.01); *C09K 2208/10* (2013.01)

(58) Field of Classification Search
CPC .............. C09K 2208/10; C09K 8/5045; C09K 8/5083; C09K 8/516; C09K 8/035; C09K 8/032; C09K 8/665; C09K 8/68; C09K 8/92; C09K 8/487; C09K 8/05; C09K 8/76
See application file for complete search history.

(56) References Cited

U.S. PATENT DOCUMENTS

| | | | |
|---|---|---|---|
| 5,701,955 A | * | 12/1997 | Frampton .............. C09K 8/502 166/295 |
| 11,124,686 B2 | | 9/2021 | Rojas et al. |
| 12,043,788 B2 | | 7/2024 | Deville et al. |
| 2007/0015668 A1 | | 1/2007 | Harrower et al. |

(Continued)

FOREIGN PATENT DOCUMENTS

| | | |
|---|---|---|
| CA | 2987773 C | 5/2024 |
| CN | 104694092 B | 6/2015 |

(Continued)

OTHER PUBLICATIONS

Foreign Communication from Related Application—International Search Report and Written Opinion of the International Searching Authority, International Application No. PCT/US2022/045535, dated Jan. 30, 2023, 11 pages.

(Continued)

*Primary Examiner* — Alicia Bland
(74) *Attorney, Agent, or Firm* — Conley Rose, P.C.; Rodney B. Carroll (57) ABSTRACT

Methods and compositions comprising nanoparticle additives for use in drilling and treatment fluid compositions are provided. In some embodiments the present disclosure includes providing a treatment fluid including an aqueous base fluid, a nanoparticle additive, and a viscosifier; introducing the treatment fluid into at least a portion of a subterranean formation to contact at least a portion of the subterranean formation; and allowing the treatment fluid to reduce fluid loss into the subterranean formation.

20 Claims, 3 Drawing Sheets

(56) References Cited

U.S. PATENT DOCUMENTS

| | | |
|---|---|---|
| 2009/0264321 A1 | 10/2009 | Showalter et al. |
| 2010/0263866 A1 | 10/2010 | Huang et al. |
| 2011/0146974 A1* | 6/2011 | Hartshorne ............. E21B 47/11 |
| | | 166/305.1 |
| 2012/0015852 A1 | 1/2012 | Quintero et al. |
| 2012/0305254 A1 | 12/2012 | Chen et al. |
| 2013/0017610 A1 | 1/2013 | Roberts et al. |
| 2014/0349894 A1 | 11/2014 | Quintero et al. |
| 2014/0374095 A1 | 12/2014 | Ladva et al. |
| 2016/0024367 A1 | 1/2016 | Zha et al. |
| 2016/0186032 A1* | 6/2016 | Yu ............................ C09K 8/04 |
| | | 175/70 |
| 2016/0362594 A1* | 12/2016 | Rojas ....................... C09K 8/46 |
| 2016/0376488 A1* | 12/2016 | Galindo ................. C09K 8/035 |
| | | 175/65 |
| 2017/0088762 A1 | 3/2017 | Zhang et al. |
| 2018/0237680 A1 | 8/2018 | Hall et al. |
| 2020/0115609 A1 | 4/2020 | Pop et al. |
| 2020/0270504 A1 | 8/2020 | Khamatnurova et al. |
| 2020/0332170 A1* | 10/2020 | Santra ................... C01B 32/162 |
| 2024/0010902 A1 | 1/2024 | Deville et al. |

FOREIGN PATENT DOCUMENTS

| | | |
|---|---|---|
| WO | 2006013595 A1 | 2/2006 |
| WO | 2013116920 A1 | 8/2013 |
| WO | 2016196332 A1 | 12/2016 |
| WO | 2020102258 A1 | 5/2020 |
| WO | 2024015658 A1 | 1/2024 |

OTHER PUBLICATIONS

Foreign Communication from Related Application—United Kingdom Combined Search and Examination Report, regarding Application No. GB 2214315.0, dated Mar. 1, 2023, 7 pages.

Electronic Filing Receipt, Specification and Drawings for U.S. Appl. No. 18/744,283, entitled "Core-Shell Particles for Subterranean Operations," filed Jun. 14, 2024, 96 pages.

OSPAR List of Substances Used and Discharged Offshore which Are Considered to Pose Little or No Risk to the Environment (PLONOR)—Update 2021.

Foreign Communication from Related Application—International Search Report and Written Opinion of the International Searching Authority, International Application No. PCT/US2023/067781, dated Jun. 1, 2023, 12 pages.

Foreign Communication from Related Application—International Search Report and Written Opinion of the International Searching Authority, International Application No. PCT/US2025/021738, dated Jul. 10, 2025, 10 pages.

First Office Action dated Jul. 11, 2025 (38 pages), U.S. Appl. No. 18/744,283, filed Jun. 14, 2024.

* cited by examiner

WELLBORE STABILITY COMPOSITIONS COMPRISING NANOPARTICLES

BACKGROUND

The present disclosure relates to systems and methods for drilling and/or treating subterranean formations that include shale.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes. A drilling fluid, or "mud" which a drilling fluid is also often called, is a treatment fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

Drilling and treatment fluids may deposit a layer of particles known as "filter cake" on the walls of the well bores within the producing formations. The filter cake may help prevent the drilling and servicing fluids from being lost into the formation and prevents solids from entering the porosities of the rock. Following completion and prior to initiating production, the filter cake may be degraded or allowed to degrade to allow product to flow into the well bore for production. Degrading the filter cake may retain well bore connectivity and the natural permeability of the reservoir rock. If not degraded or allowed to degrade, the filter cake could present an impediment to production, inter alia, by altering the permeability of the reservoir. Once the permeability of the reservoir has been diminished, it is seldom able to restore it to its original condition. Drilling and treatment fluids may include fluid loss control additives to further assist in preventing the drilling and servicing fluids from being lost into the formations.

During drilling of subterranean well bores, various strata that include reactive shales may be encountered. As used herein, the term "shale" is defined to mean materials that may "swell," or increase in volume, when exposed to water. Examples of these shales include certain types of clays (for example, bentonite). When drilling into shale formations with water-based fluids the formation may experience a pore pressure increase and swelling from penetration of the shale by the fluid. Shale stabilizers may be added to the mud to inhibit these phenomena and to stabilize the shale from being affected by the mud.

Reducing drilling fluid pressure invasion into the wall of a borehole may be an important factor in maintaining wellbore stability. Maintaining sufficient borehole pressure may stabilize shales to maintain the integrity of the borehole. When mud or liquid invades the shale, the pressure in the pores may rise and the pressure differential between the mud column and the shale may fall. With the drop in differential pressure, the shale may no longer be supported and can break off and fall into the well bore. Likewise, the invasion of water into the shale matrix may increase hydration or wetting of the partially dehydrated shale body causing it to soften and to lose its structural strength. Chemical reactivity may also lead to instability.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for drilling and/or treating subterranean formations. More particularly, the present disclosure relates to nanoparticle additives that may provide improved fluid loss control and shale inhibition.

The present disclosure provides nanoparticle additives for use in drilling and treatment fluid compositions and methods of using them. In some embodiments, the drilling and treatment fluids of the present disclosure may include a nanoparticle additive and one or more additional additives such as bridging agents, shale inhibitors, salts, and/or viscosifiers. In certain embodiments, the drilling and treatment fluids of the present disclosure may include a nanoparticle additive, one or more shale inhibitors, and one or more salts. In some embodiments, the nanoparticle additive may be a nanocomposite. In certain embodiments, the nanocomposite may include a shell that includes, consists essentially of, or consists of an organic water soluble polymer, or a crosslinked polymer that would be water soluble if not crosslinked. In some embodiments, the crosslinked polymer including acrylamide repeating units is a polyacrylamide copolymer. In some embodiments, the nanocomposites may not substantially swell in water and, thus, may not cause significant viscosification or gelation of the treatment fluid. In certain embodiments, the nanocomposites may be thermally stable up to at least about 180° C. In some embodiments, the nanocomposites may be thermally stable up to at least about 250° C.

Among the many potential advantages to the methods and compositions of the present disclosure, only some of which are alluded to herein, may provide reduced fluid loss and/or reduced pore pressure transmission. When employed as a component of a treatment fluid (e.g., drilling fluid) that includes bridging agents, the nanoparticle additives may provide improved fluid loss properties in mud drilling applications, decreasing the initial spurt and the total filtrate volume in fluid loss tests. When employed as a component of a treatment fluid that includes shale inhibitors and salts, the nanoparticle additives may provide reduced pore pressure transmission in shale formations. In some embodiments, the treatment fluids of the present disclosure may include a nanoparticle additive and bridging agent without shale inhibitors. In other embodiments, the treatment fluids of the present disclosure may include a nanoparticle additive and shale inhibitor without including a bridging agent. In still other embodiments, the treatment fluids of the present disclosure may include a nanoparticle additive and both a bridging agent and shale inhibitor. In some embodiments, the treatment fluids of the present disclosure may include a nanoparticle additive and a viscosifier. For example, in certain embodiments, the treatment fluids of the present disclosure may include a nanoparticle additive and a biopolymer viscosifier. In certain embodiments, it is believed that combining a nanoparticle additive with one or more additional additives may have a synergistic effect on the fluid loss control capabilities of the present disclosure.

The treatment fluids used in the methods and systems of the present disclosure may include any aqueous base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In certain embodiments, the treatment fluids may include a mixture of one or more aqueous fluids with other fluids and/or gases, including but not limited to emulsions, foams, and the like.

In certain embodiments, the treatment fluids used in the methods and systems of the present disclosure may include an emulsion. The emulsions of the present disclosure generally include two or more immiscible liquids, such as a polar (aqueous) fluid and a nonpolar (oil-based) fluid. In certain embodiments, the emulsions of the present disclosure may be traditional emulsions (e.g., emulsions having an aqueous continuous phase and an oil-based discontinuous phase). In other embodiments, the emulsions of the present disclosure may be invert emulsions (e.g., emulsions having an oil-based continuous phase and an aqueous discontinuous phase). The aqueous phase of the emulsions may include water from any source. Suitable aqueous fluids may include any of the aqueous base fluids discussed above. The oil-based phase may include any type of oil-based liquid. Examples of oil-based liquids that may be suitable for use in the methods and systems of the present disclosure include, but are not limited to, oils, hydrocarbons, esters, ethers, non-polar organic liquids, and the like. In certain embodiments, the oil-based liquid may be diesel oil. The two phases of the emulsion may be included in any suitable amounts and/or ratios. For example, in certain embodiments, the emulsion may include an aqueous phase and an oil phase in a ratio of from about 99:1 to about 1:99. In certain embodiments, the emulsion of the present disclosure may be a water-in-oil emulsified acid. In certain embodiments, the nanoparticle additives of the present disclosure may be contained in the water-based continuous phase.

In certain embodiments, the treatment fluids used in the methods and systems of the present disclosure may include an emulsifier. The emulsifier may be an emulsifying surfactant or any other emulsifier suitable to lower the interfacial tension between oil and water to allow stable emulsion formation. Depending upon the particular application of the methods of the present disclosure, the surfactant may be cationic, anionic, nonionic, or amphoteric, and may be monomeric or polymeric. Types of cationic surfactants that may be suitable for certain embodiments of the present disclosure include, but are not limited to, arginine methyl esters, alkanolamines, alkylenediamines, alkyl amines, alkyl amine salts, quaternary ammonium salts such as trimethyltallowammonium chloride, amine oxides, alkyltrimethyl amines, triethyl amines, alkyldimethylbenzylamines, alkylamidobetaines such as cocoamidopropyl betaine, alpha-olefin sulfonate, $C_8$ to $C_{22}$ alkylethoxylate sulfate, trimethylcocoammonium chloride, derivatives thereof, and combinations thereof. Types of anionic surfactants that may be suitable for certain embodiments of the present disclosure include, but are not limited to, alkali metal alkyl sulfates, alkyl ether sulfonates, alkyl sulfonates, alkylaryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, phosphate esters alkyl carboxylates, alkylether carboxylates, N-acylaminoacids, N-acylglutamates, N-acylpolypeptides, alkylbenzenesulfonates, paraffinic sulfonates, α-olefin sulfonates, lignosulfates, derivatives of sulfosuccinates, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, and combinations thereof. Types of non-ionic surfactants that may be suitable for certain embodiments of the present disclosure include, but are not limited to, amides, diamides, polyglycol esters, alkyl polyglycosides, sorbitan esters, methyl glucoside esters and alcohol ethoxylates alcohol oxylalkylates, alkyl phenol oxylalkylates, nonionic esters such as sorbitan esters alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylates. Examples of nonionic surfactants that may be suitable include, but are not limited to, alkylphenol ethoxylates, nonylphenol ethoxylates, octylphenol ethoxylates, tridecyl alcohol ethoxylates, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, and the like.

In some embodiments, the drilling and treatment fluids of the present disclosure may include a nanoparticle additive. In some embodiments, the nanoparticle additive of the present disclosure may include any known nanoparticles compatible with subterranean formations including, but not limited to, quantum dots including quantum dots of cadmium selenide, cadmium sulfide, indium arsenide, indium phosphide, copper indium sulfide, zinc sulfide, and the like; carbon nanoparticles including carbon cage structures like fullerenes and carbon nanotubes (single and multi-walled), graphenes (single and multilayered), and nanodiamonds; polymeric nanoparticles including nanoparticles of gums, chitosans, gelatins, sodium alginates, albumins, cellulosics, poly(ethylene imines), poly(ethylene glycols), poly(propylene glycols), poly(acrylic acids), poly(vinyl alcohols), methacrylates, acrylates, poly(2-hydroxy ethyl methacrylates), poly(methyl methacrylates), poly(methyacrylic acids), poly (vinyl pyrrolidones), acrylamides, poly(acrylamides), poly (ethylene-co-vinyl acetates), polylactides, polyglycolides, polyanhydrides, polyorthoesters, polycyanoacrylates, polycaprolactone, and copolymers thereof; dendrimers including 2nd or higher generation dendrimers and 2nd or higher generation dendrons; ceramic nanoparticles including nanoclays and nanoparticles of composite ceramics, carbides, borides, nitrides, siilcides, and oxides like silicas, aluminas, beryllias, cerias, and zirconias; core-shell nanoparticles including multi-shell nanoparticles, also known as onionated nanoparticles; metal nanoparticles including nanoparticles of gold, silver, iron, copper, nickel, zinc, tin, and any combination thereof, metal oxide nanoparticles including oxides of chromium, manganese, iron, cobalt, nickel, copper, zinc, molybdenum, indium, tin, lead, gadolinium, erbium, any oxidation state thereof, and any combination thereof; nanowires including nanowires of metals, semimetals, metal oxides, ceramics, and any combination thereof, diamond nanosensors; functionalized derivatives thereof including water-dispersible derivatives and oil-dispersible derivatives; and any combination thereof.

In some embodiments, the drilling and treatment fluids of the present disclosure may include a nanoparticle additive that is a nanocomposite. The nanocomposite may include a core-shell morphology wherein the core material includes, consists essentially of, or consists of silica, modified silica, titania, iron oxide, or another organic or inorganic nanoparticle. In some embodiments, the core of the nanocomposite has a size of from about 5 nm to about 500 nm. In other embodiments the core of the nanocomposite has a size of from about 5 nm to about 450 nm, or about 5 nm to about 400 nm, or about 5 nm to about 350 nm, or about 5 nm to about 300 nm, or about 5 nm to about 250 nm, or about 5 nm to about 200 nm, or about 5 nm to about 150 nm, or about 5 nm to about 100 nm, or about 5 nm to about 50 nm, or about 5 nm to about 20 nm, or about 10 nm to about 500 nm, or about 10 nm to about 400 nm, or about 10 nm to about 300 nm, or about 10 nm to about 200 nm, or about 10 nm to about 100 nm, or about 10 nm to about 50 nm, or about 10 nm to about 40 nm, or about 10 nm to about 30 nm, or about 10 nm to about 20 nm. In some embodiments, average particle size indicates average size of discrete particles, not agglomerates thereof. In other embodiments, the particle size indicates average size of particle agglomerates. In embodiments, the particle size of the nanoparticulate is an average dimension in at least one direction.

In some embodiments, the nanoparticle additive may be synthesized using two or more nanoparticle sources. For example, in some embodiments, nanoparticles having an average particle size of about 10 nm to 20 nm are mixed with nanoparticles having an average particle size of 100 nm to 200 nm in a single synthesis of nanocomposites. By using two or more nanoparticle sources, bimodal or higher order modes of nanocomposite particle average sizes may be obtained. In some embodiments, the two or more nanoparticle sources include nanoparticles of varying composition. Such nanoparticle sources may be blended to obtain a final product having two different nanocomposite compositions. In some embodiments, nanoparticle sources of different average particle size, different composition, or both are blended in a single synthesis to reach a targeted nanocomposite composition.

In certain embodiments, the nanocomposites may include colloidal particulates suspended in water and dry particulates. Suitable inorganic nanoparticles may include silica, treated or partially treated fumed silica, colloidal silica, or silica-alumina composite particles; alumina, titania, zirconia, or clay; carbon; and natural product based particulates such as lignite. In some embodiments, microporous and mesoporous particulates incorporating these chemistries may be useful in forming the nanocomposites. In other embodiments, any of these particulates may be used with or without surface treatment thereof. In some embodiments, surface treatments may be employed to produce a more hydrophobic particulate surface; such particulates are termed hydrophobically modified. For example, silane coupling agents (general formula of $(RO)_3SiR'$, where R and R' are alkyl groups) are commonly employed to condense and/or bond to the surface of the particulate, thereby providing an alkyl group (R') on the particle surface to increase the hydrophobicity of the surface. In some embodiments, R' is a polymerizable group, such as an acrylate or acrylamide functional group. In such embodiments, subsequent polymerization leads to a polymer grafted to the nanoparticle.

The nanocomposite may include a shell that includes, consists essentially of, or consists of an organic water soluble polymer, or a crosslinked polymer that would be water soluble if not crosslinked. In some embodiments, the organic water soluble polymer or crosslinked polymer may be formed from one or more monomers. In certain embodiments, the monomers may include acrylamide, methacrylamide, N,N-dimethylacrylamide, N-isopropylacrylamide, acrylic acid and salts thereof, 2-acryloylamino-2-methylpropane-1-sulfonic acid (AMPSA) and salts thereof, dimethylaminopropyl methacrylamide (DMAPMA), methacrylamido propyltrimethylammonium chloride (MAPTAC), N,N-dimethyl-N,N-diallyl ammonium chloride (DADMAC), [3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), acryloyloxyethyldimethylbenzyl ammonium chloride (AEDBAC), methacryloyloxyethyldimethylbenzyl ammonium chloride (MEDBAC), N-vinylpyrrolidone (VP), and combinations thereof in any ratio. In certain embodiments, the shell includes, consists essentially of, or consists of a biodegradable polymer coating. In some embodiments, the biodegradable polymers may be grated onto the nanocomposite. In one or more embodiments, the biodegradable polymers may be a biopolymer or one or more monomers that may be polymerized to create a biodegradable polymer. In certain embodiments, the biopolymer may be starch, cellulose/modified cellulose, welan gum, diutan, scleroglucan, guar, pectin and the like) and biodegradable synthetics such as viscose, polyesters, or polyamides. In some embodiments, the monomers that may be polymerized to create a biodegradable polymer include glucose, fructose, galactose, ribose, xylose, mannose, glucuronic acid, rhamnose, glucosamine, sucrose, maltose, lactose, lactulose, glycolic acid, lactic acid, caprolactone, 3-hydroxypropionic acid, succinic acid, alpha-amino acids, and beta-amino acids. In some embodiments, the monomers include, consist essentially of or consist of acrylamide and acrylic acid and salts thereof, in some such embodiments, the mole ratio of acrylamide to acrylic acid is about 70:30. In some embodiments, the monomers include, consist essentially of or consist of acrylamide, acrylic acid and salts thereof, and AMPSA and salts thereof. In some embodiments, the monomers include, consist essentially of or consist of acrylamide and AMPSA and salts thereof. In some embodiments, the monomers include, consist essentially of or consist of acrylamide.

In some embodiments, the crosslinked polymer may be crosslinked with a crosslinking agent. As used herein, the term "crosslinking agent" includes any molecule, atom, or ion that is capable of forming one or more crosslinks between molecules of the crosslinkable polymer and/or between two or more atoms in a single molecule of the crosslinkable polymer. As used herein, the term "crosslink" as used herein refers to a covalent or ionic bond that links one polymer chain to another. When crosslinked, any crosslinking agent known in the art may be used. In some embodiments, suitable crosslinking agents may include at least one of a dialdehyde, a dialdehyde-forming compound, a carboxylic acid or an ester thereof, a sulfonic acid or an ester thereof, a phosphonic acid or an ester thereof, an acid anhydride, an epihalohydrin, a di-epoxide, or any combination thereof. Examples of such crosslinking agents that may be suitable in certain embodiments include, but are not limited to, epichlorohydrin, glutaraldehyde, succinaldehyde, paraformaldehyde, and other dialdehydes. In some embodiments, crosslinking agents may include one or more ions of chromium, aluminum, antimony, zirconium, titanium, calcium, boron, iron, silicon, copper, zinc, magnesium, or any combination thereof. Examples of such crosslinking agents that may be suitable in certain embodiments include, but are not limited to boric acid, borax, a borate, a $(C_1-C_{30})$hydrocarbylboronic acid, a $(C_1-C_{30})$hydrocarbyl ester of a $(C_1-C_{30})$ hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, aluminum citrate, or any combination thereof.

When used, the crosslinking agent may be included in the fluid in any suitable amount depending on, among other factors, the amount and/or molecular weight of the crosslinked polymer, the desired viscosity of the fluid, and the like. In some embodiments, the crosslinking agent may be included in amount that is about 0.1 to 5 times the amount of monomer included in the fluid. In some embodiments, the crosslinking agent may be included in amount that is about 0.2 to 3 times the amount of monomers included in the fluid. In some embodiments, the crosslinking agent may be included in amount that is about 0.5 to 2 times the amount of monomers included in the fluid. In some embodiments, the crosslinking agent may be included in amount that is about 1.5 times the amount of monomers included in the fluid.

The nanoparticle additives may be provided in a drilling or treatment fluid in any suitable amount. In some embodiments, the nanoparticle additives may be included in the treatment fluid in a concentration of from about 0.1 pounds per barrel (lb/bbl) to about 20 lb/bbl. In some embodiments, the nanoparticle additives may be included in the treatment fluid in an concentration of from about 0.2 lb/bbl to about 10 lb/bbl. In some embodiments, the nanoparticle additives may be included in the treatment fluid in an concentration of from about 0.5 lb/bbl to about 5 lb/bbl. In some embodiments, the nanoparticle additives may be included in the treatment fluid in an concentration of from about 0.5 lb/bbl to about 1.5 lb/bbl. A person of skill in the art with the benefit of this disclosure will recognize suitable amounts of the nanoparticle additives to include in a drilling or treatment fluid of the present disclosure based on, among other things, the amount and/or reactivity of shale in the formation, other components of the treatment fluid (e.g., brines), the desired viscosity of the drilling or treatment fluid, and other parameters of the operation in which the drilling or treatment fluid will be used.

In certain embodiments, the drilling and treatment fluids of the present disclosure may form a thin, degradable filter cake in a subterranean formation. In some embodiments, the drilling and treatment fluids of the present invention may be less invasive to the formation yet provide lubricity, effective fluid loss control, and good filter cake sealing and plastering characteristics. In some embodiments, the present disclosure provides an aqueous-based drilling or treatment fluid that includes one or more bridging agents and a nanoparticle additive. In other embodiments, the present invention provides drilling or treatment fluids that include an aqueous base fluid (e.g., a brine or fresh water), one or more bridging agents, and one or more nanoparticle additives. In some embodiments, the nanoparticle additives of the present disclosure provide enhanced fluid loss control by mixing with the bridging agents to form the filter cake. In some embodiments, the nanoparticle additives of the present disclosure may reduce fluid loss by about 20% to about 80%. In other embodiments, the nanoparticle additives of the present disclosure may reduce fluid loss by about 30% to about 70%. In still other embodiments, the nanoparticle additives of the present disclosure may reduce fluid loss by about 40% to about 65%.

In certain embodiments, the drilling and treatment fluids of the present disclosure may also include one or more bridging agents. Examples of bridging agents suitable for use in the methods of the current disclosure include, but are not necessarily limited to, calcium succinate, calcium maleate, magnesium tartrate, bismuth citrate, calcium carbonate, and other salts, clays, biopolymer viscosifiers, modified and unmodified starches, polyanionic cellulose, graphite, lignite, gilsonite, petroleum coke, any derivatives thereof, and any hydrates thereof. Examples of degradable bridging agents may include, but are not necessarily limited to, bridging agents including degradable materials such as degradable polymers. In some embodiments, the bridging agents are either self-degrading or degradable in a suitable clean-up solution (e.g., a mutual solvent, water, an acid solution, etc.). In some embodiments, a polymer is considered to be "degradable" herein if the degradation is due to, inter alia, chemical and/or radical process such as hydrolysis, oxidation, enzymatic degradation, or UV radiation. Suitable examples of degradable polymers that may be used in accordance with the present disclosure include, but are not necessarily limited to, polysaccharides such as dextrans or celluloses; chitins; chitosans; proteins; orthoesters; aliphatic polyesters; poly(lactides); poly(glycolides); poly(F-caprolactones); poly(hydroxybutyrates); poly(anhydrides); aliphatic polycarbonates; poly(orthoesters); poly(amino acids); poly(ethylene oxides); polyphosphazenes; any derivatives thereof; and any combinations thereof. In some embodiments, the bridging agents may be in the water-based continuous phase of an oil in water emulsified treatment fluid. In some embodiments, the treatment fluids including a nanoparticle additive of the present disclosure and a bridging agent may provide greater fluid loss control than a treatment fluid with only the nanoparticle additive or bridging agent alone.

In some embodiments, the drilling and treatment fluids of the present disclosure including a nanoparticle additive may further include one or more shale inhibitors. In certain embodiments, the shale inhibitors may be amines including primary, secondary, tertiary, and quaternary amines; ethoxylated and propoxylated amines, Jeffamines, hexamethylenediamine and derivatives, choline chloride, guanidine, glycols, polyalkylene glycols, potassium salts, silicates, polymers of acrylamide, acrylic acid and salt derivatives, and vinylpyrrolidone such as polyacrylamide, partially hydrolyzed polyacrylamide, polyvinypyrrolidone, and copolymers of these polymers. In some embodiments, the shale inhibitors may be one or more amines included in an amount of about 0.5% to about 4% by volume (1.75 lb/bbl to about 4 lb/bbl). In some embodiments, the shale inhibitors may be one or more glycols included in an amount of about 0.5% to about 4% by volume (1.75 lb/bbl to about 4 lb/bbl). In some embodiments, the shale inhibitors may be one or more polymers included in an amount of about 0.1 lb/bbl to about 0.2 lb/bbl).

In some embodiments, the treatment fluids of the present disclosure may contain one or more salts, inter alia, to provide the desired density to the treatment fluid. One of ordinary skill in the art, with the benefit of this disclosure, will recognize the need for caution when combining a salt with a treatment fluid for use in certain regions of the world where such use of a salt may be subject to environmental restrictions. One of ordinary skill in the art will also recognize where it is desirable to use a dense brine rather than, among other things, a solid weighting agent. Where the use of a salt is permissible, a variety of salts may be used. Examples of suitable salts include, but are not limited to, potassium chloride, sodium chloride, potassium formate, potassium carbonate, calcium chloride, and calcium bromide. In certain embodiments, a mixture of suitable salts may be used. In certain embodiments, the salts may be present in the treatment fluids of the present disclosure in an amount in the range of from about 5 pounds per barrel to about the salt saturation limit of the treatment fluid.

In some embodiments, the treatment fluids of the present disclosure may include a nanoparticle additive, shale inhibitor, and salt. In those embodiments, the treatment fluids may provide for reduced pore pressure transmission. In some embodiments, the treatment fluids of the present disclosure may reduce pore pressure transmission by increasing the amount of time required for the pore pressure to equilibrate. In certain embodiments, the treatment fluids of the present disclosure may increase the amount of time required for pore pressure equilibration by about 1.5 times to about 2.5 times the amount of time required for a baseline fluid without the nanoparticle additives of the present disclosure. In some embodiments, the treatment fluids of the present disclosure may reduce pore pressure transmission by lowering the equilibrium pressure. In certain embodiments, the treatments fluids of the present disclosure may lower the equilibrium pressure by about 100 psi to about 500 psi.

In some embodiments, the treatment fluids used in the methods and systems of the present disclosure optionally may include one or more weighting agents, among other purposes, to provide a treatment fluid of the desired weight and/or density for the subterranean formation in which it is used. Examples of weighting agents that may be suitable in certain embodiments include but are not limited to, barites (barium sulfate), hematite, iron ores, siderite, ilmenite, galena, carbonates (e.g., calcium carbonate, magnesium carbonate, iron carbonate, zinc carbonate), manganese tetraoxide, chloride salts (e.g., NaCl, KCl, $CaCl_2$), formate salts, and any combination thereof. These weighting agents may be at least partially soluble or insoluble in the treatment fluid. The weighting agents may be included in a treatment fluid in any amount needed to impart the desired properties to the fluid. In some embodiments, a weighting agent may be present in the treatment fluids in an amount of from about 1% to about 60% by weight of the treatment fluid (e.g., about 5%, about 10%, about 15%, about 20%, about 25%, about 30%, about 35%, about 40%, about 45%, about 50%, about 55%, etc.). In some embodiments, the weighting agents may be present in the treatment fluids in an amount of from about 1% to about 35% by weight of the treatment fluid. In some embodiments, the weighting agent may be present in the treatment fluids in an amount of from about 1% to about 10% by weight of the treatment fluid.

In certain embodiments, the treatment fluids used in the methods and systems of the present disclosure optionally may include one or more viscosifiers, which may include any substance that is capable of increasing the viscosity of a fluid, for example, by forming a gel. In some embodiments, the viscosifier may be a biopolymer such as guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), xanthan, scleroglucan, diutan, alginate, carrageenan, welan gum, gellan gum, pectin, polyuronides, glucomannan, starches, or chitosans. In other embodiments, the viscosifier may be clays, polyvinyl alcohols, acrylamides, acrylates, viscoelastic surfactants (e.g., methyl ester sulfonates, hydrolyzed keratin, sulfosuccinates, taurates, amine oxides, ethoxylated amides, alkoxylated fatty acids, alkoxylated alcohols, ethoxylated fatty amines, ethoxylated alkyl amines, betaines, modified betaines, alkylamidobetaines, etc.), combinations thereof, and derivatives thereof. In certain embodiments, the viscosifiers may be "crosslinked" with a crosslinking agent, among other reasons, to impart enhanced viscosity and/or suspension properties to the fluid. The viscosifiers may be included in any concentration sufficient to impart the desired viscosity and/or suspension properties to the fluid. In certain embodiments, the viscosifier may be included in an amount of from about 0.1% to about 10% by weight of the fluid. In other embodiments, the viscosifier may be present in the range of from about 0.1% to about 5% by weight of the fluid. In some embodiments, the treatment fluids including a nanoparticle additive of the present disclosure and a viscosifier may provide greater fluid loss control than a treatment fluid with only the nanoparticle additive or viscosifier alone.

In some embodiments, the treatment fluids used in the methods and systems of the present disclosure optionally may include any number of additional additives. Examples of such additional additives include, but are not limited to, salts, surfactants, acids, proppant particulates, diverting agents, filtration agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional shale inhibitors, $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the nanoparticle additives and/or other components of the treatment fluid may be metered directly into a base treatment fluid to form a treatment fluid. In certain embodiments, the base fluid may be mixed with the nanoparticle additives and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluid such as a drilling fluid of the present disclosure may be introduced into at least a portion of a well bore as it is drilled to penetrate at least a portion of a subterranean formation. In certain embodiments, the subterranean formation may be a low or ultra-low permeability shale formation. The drilling fluid may be circulated in the well bore during drilling, among other reasons, to cool and/or lubricate a drill bit and/or drill pipe to prevent them from sticking to the walls of the wellbore, prevent blowouts by serving as a hydrostatic head to counteract the sudden entrance into the well bore of high pressure formation fluids, suspend or remove formation cuttings from the well bore, and/or enhance the stability of the well bore during drilling.

The treatment fluids and nanoparticle additives disclosed herein may directly or indirectly affect one or more components or pieces of equipment associated with the preparation, delivery, recapture, recycling, reuse, and/or disposal of the disclosed treatment fluids and nanoparticle additives. For example, and with reference to FIG. 1, the disclosed treatment fluids and nanoparticle additives may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
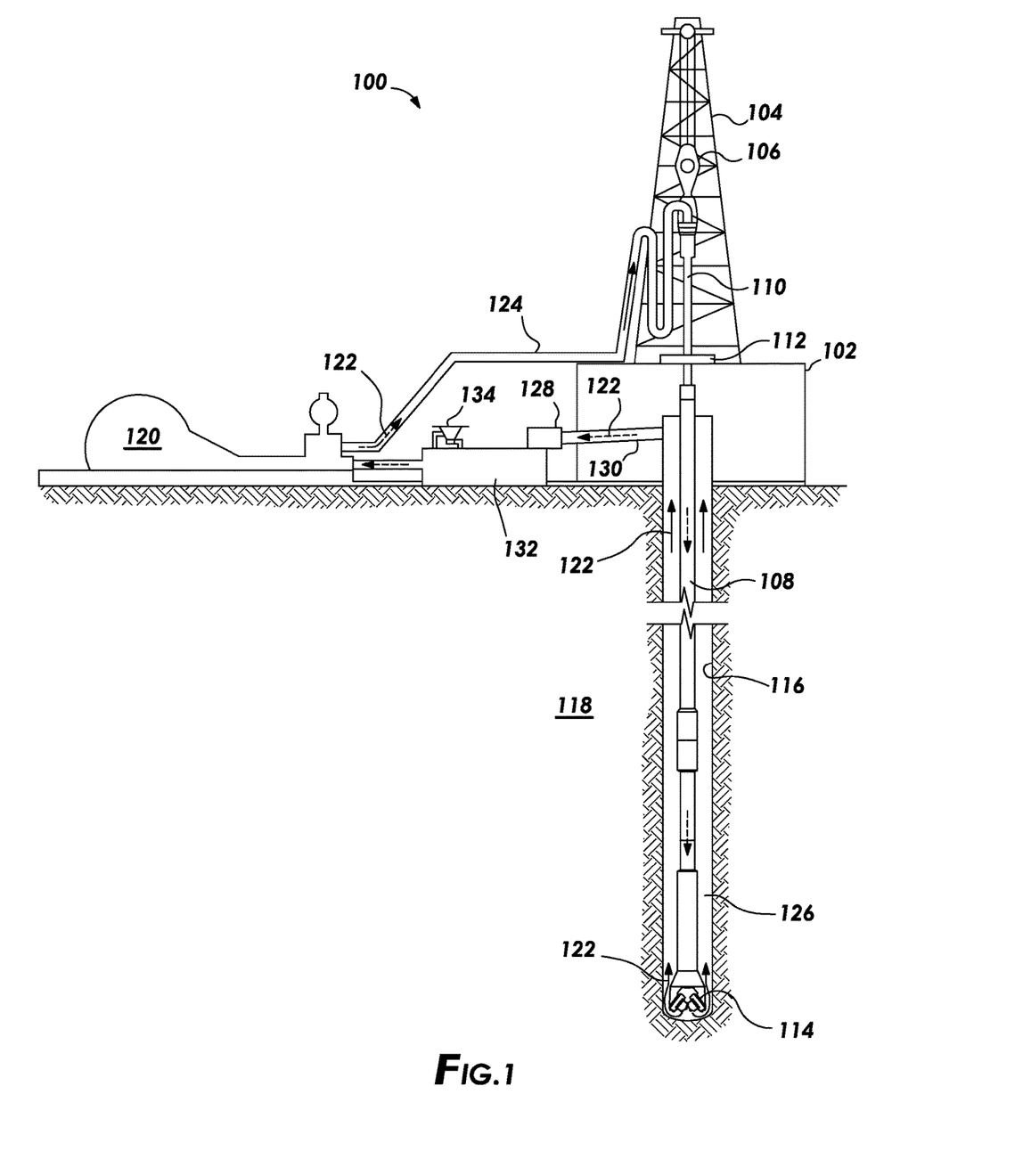
FIG. 1 is a diagram illustrating an example of a well bore drilling assembly that may be used in accordance with certain embodiments of the present disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed nanoparticle additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed nanoparticle additives may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed nanoparticle additives may be stored, reconditioned, and/or regulated until added to the drilling fluid 122.

As mentioned above, the disclosed nanoparticle additives may directly or indirectly affect the components and equipment of the drilling assembly 100. For example, the disclosed nanoparticle additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the nanoparticle additives.

The disclosed nanoparticle additives may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The disclosed treatment fluids and nanoparticle additives may also directly or indirectly affect the mixing hopper 134 and the retention pit 132 and their assorted variations.

The disclosed treatment fluids and/or nanoparticle additives may also directly or indirectly affect the various downhole equipment and tools that may come into contact with the treatment fluids and nanoparticle additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treat treatment fluids and/or nanoparticle additives may also directly or indirectly affect any downhole heat exchangers, valves and corresponding actuation devices, tool seals, packers and other wellbore isolation devices or components, and the like associated with the wellbore 116. The disclosed treatment fluids and/or nanoparticle additives may also directly or indirectly affect the drill bit 114, which may include, but is not limited to, roller cone bits, PDC bits, natural diamond bits, any hole openers, reamers, coring bits, etc.

An embodiment of the present disclosure is a method including providing a treatment fluid including an aqueous base fluid, a nanoparticle additive, and a viscosifier; introducing the treatment fluid into at least a portion of a subterranean formation to contact at least a portion of the subterranean formation; and allowing the treatment fluid to reduce fluid loss into the subterranean formation.

In one or more embodiments described in the preceding paragraph, the nanoparticle additive includes a nanocomposite including a core and a shell. In one or more embodiments described above, the core includes a material selected from the group consisting of: silica, treated or partially treated fumed silica, colloidal silica, silica-alumina composite particles; alumina, titania, zirconia, or clay; carbon; and lignite. In one or more embodiments described above, the shell includes an organic water soluble polymer or a cross- linked polymer. In one or more embodiments described above, the shell is substantially biodegradable. In one or more embodiments described above, the viscosifier includes a biopolymer viscosifier. In one or more embodiments described above, the treatment fluid further includes one or more salts.

Another embodiment of the present disclosure is a method including providing a treatment fluid including an aqueous base fluid and a nanoparticle additive, a shale inhibitor, and a salt; introducing the treatment fluid into at least a portion of a subterranean formation to contact at least a portion of the subterranean formation; and allowing the nanoparticle additive to reduce a pore pressure transmission. In one or more embodiments described in the preceding paragraph, the nanoparticle additive includes a nanocomposite including a core and a shell. In one or more embodiments described above, the core includes a material selected from the group consisting of: silica, treated or partially treated fumed silica, colloidal silica, silica-alumina composite particles; alumina, titania, zirconia, or clay; carbon; and lignite. In one or more embodiments described above, the shell includes an organic water soluble polymer or a crosslinked polymer. In one or more embodiments described above, the crosslinked polymer includes one or more monomers selected from the group consisting of: acrylamide, methacrylamide, N,N-dimethylacrylamide, N-isopropylacrylamide, acrylic acid and salts thereof, 2-acryloylamino-2-methylpropane-1-sulfonic acid (AMPSA) and salts thereof, dimethylaminopropyl methacrylamide (DMAPMA), methacrylamido propyltrimethylammonium chloride (MAPTAC), N,N-dimethyl-N,N-diallyl ammonium chloride (DADMAC), [3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), acryloyloxyethyldimethylbenzyl ammonium chloride (AEDBAC), methacryloyloxyethyldimethylbenzyl ammonium chloride (MEDBAC), N-vinylpyrrolidone (VP), and any combinations thereof. In one or more embodiments described above, the shale inhibitor is selected from the group consisting of: an amine including primary, secondary, tertiary, and quaternary amines; an ethoxylated amine; a propoxylated amines; a Jeffamine, hexamethylenediamine, choline chloride, guanidine, a glycol, a polyalkylene glycol, a potassium salt, a silicate, a polymer of acrylamide, acrylic acid and salt derivatives, and vinylpyrrolidone such as polyacrylamide, partially hydrolyzed polyacrylamide, polyvinypyrrolidone, and copolymers of these polymers, any derivative thereof, and any combination thereof. In one or more embodiments described above, the salt is selected from the group consisting of: potassium chloride, sodium chloride, potassium formate, potassium carbonate, calcium chloride, and calcium bromide, and any combination thereof.

Another embodiment of the present disclosure is a method including providing a treatment fluid including an aqueous base fluid and a nanoparticle additive, a bridging agent, a shale inhibitor, and a salt; introducing the treatment fluid into at least a portion of a subterranean formation to contact at least a portion of the subterranean formation; and allowing the nanoparticle additive to reduce a pore pressure transmission. In one or more embodiments described in the preceding paragraph, the nanoparticle additive includes a nanocomposite including a core and a shell. In one or more embodiments described above, the core includes a material selected from the group consisting of: silica, treated or partially treated fumed silica, colloidal silica, silica-alumina composite particles; alumina, titania, zirconia, or clay; carbon; and lignite. In one or more embodiments described above, the shell includes an organic water soluble polymer or a crosslinked polymer. In including allowing the nanoparticle additive to become incorporated into a filter cake located on a surface within the subterranean formation. In one or more embodiments described above, the treatment fluid is introduced into the portion of the subterranean formation using one or more pumps.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

A test was performed to measure the reduction in fluid loss using a hybrid nanoparticle ("HNP") additive of the present disclosure. The formulation used contained the nanoparticle additive at a concentration of 2 lb/bbl along with polyanionic cellulose, graphite, lignite, and a blend of lignite, gilsonite, and petroleum coke. This formulation was compared to the same formulation that used a 2 lb/bbl of a traditional latex instead of the nanoparticle additive. The specific formulations are provided in Table 1 below.

TABLE 1

Fluid Formulations

|  | 2 lb/bbl Latex | 2 lb/bbl HNP |
| --- | --- | --- |
| Freshwater, bbl | 0.77 | 0.77 |
| Xanthan gum, lb | 1.2 | 1.2 |
| Polyanionic cellulose, lb | 2.5 | 2.5 |
| Shale inhibitor, lb | 4 | 4 |
| ROP Enhancer, lb | 6 | 6 |
| Lubricant, lb | 3.5 | 3.5 |
| Caustic Soda, lb | 0.3 | 0.3 |
| Latex, lb | 2 | — |
| HNP, lb | — | 2 |
| Bridging Agent, lb | 45 | 45 |
| Lignite, lb | 1 | 1 |
| Modified asphalt, lb | 4 | 4 |
| Graphite, lb | 2 | 2 |
| Barite, lb | 160 | 160 |

Figure 2:
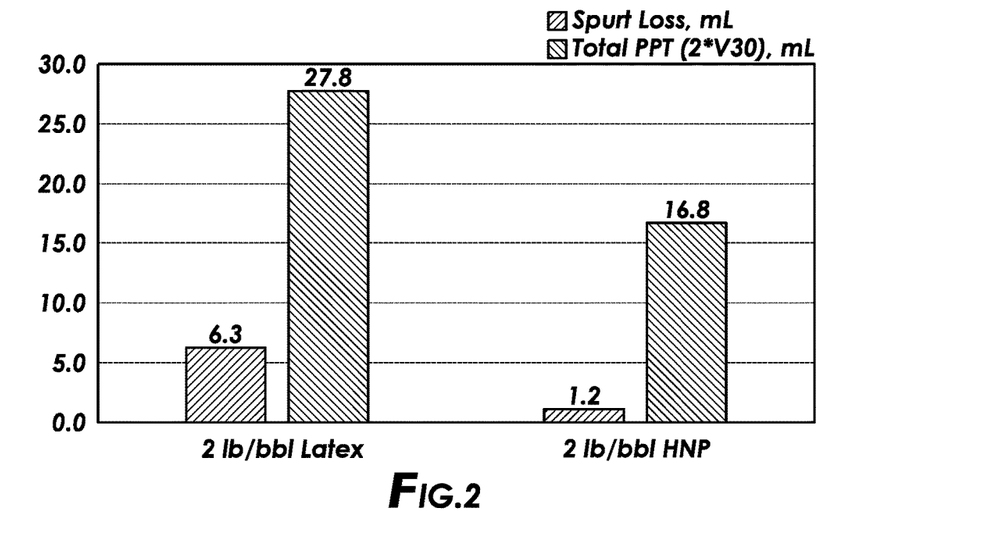
FIG. 2 is a graph illustrating data from fluid loss tests using various types of nanoparticle additives of the present disclosure.
Figure 3:
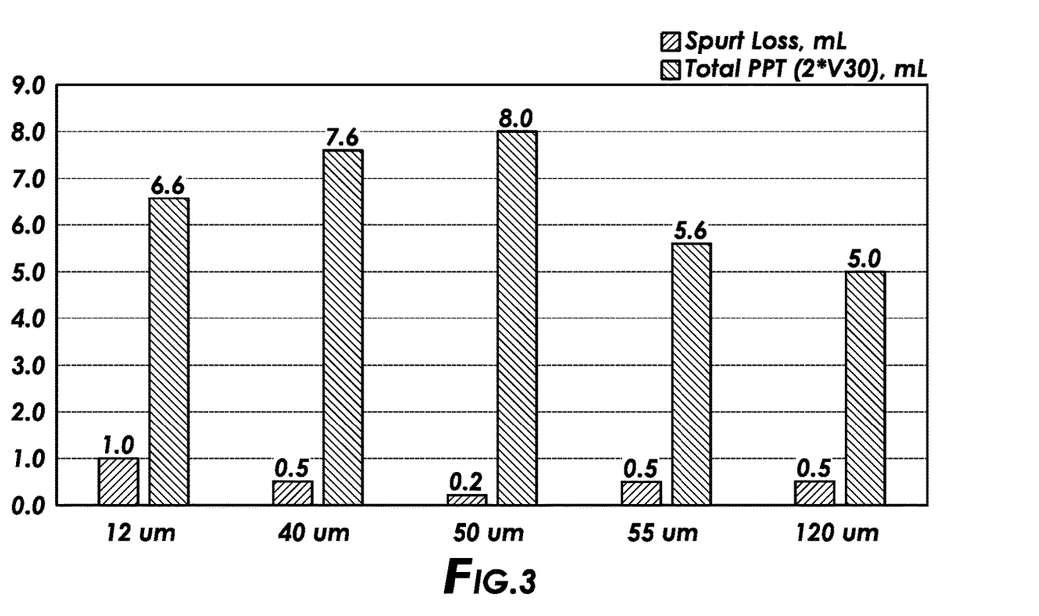
FIG. 3 is a graph illustrating data from fluid loss tests using various types of nanoparticle additives of the present disclosure.

A particle plugging test was run according to API RP 13B-1 against a 12 um ceramic disc at 180° F. with 1000 psi differential pressure. FIG. 2 provides the results showing the improved performance of the treatment fluid with the nanoparticle additive as compared to the control formulation. Specifically, the y-axis shows a reduction in spurt losses and pore pressure transmission. Spurt loss provides a measure of the instantaneous volume (spurt) of liquid that passes through a filter medium prior to deposition of a competent and controlling filter cake. Less spurt loss represents less fluid loss prior to formation of a sufficient filter cake. Pore pressure transmission measures the increase in pore pressure in a shale when exposed to a drilling fluid over a period of time. Pore pressure transmission approximates the amount of fluid lost to pores of a shale formation. Thus, the HNP fluid formulation would be expected to exhibit reduced fluid loss in a formation during wellbore treatment operations. FIG. 3 shows the results of additional tests across multiple porosities with a treatment fluid similar to the HNP fluid above that further included modified starch as shown in Table 2 below.

TABLE 2

Fluid Formulation

| Freshwater, bbl | 0.77 |
| --- | --- |
| Xanthan gum, lb | 0.5 |
| Polyanionic cellulose, lb | 1 |
| Modified starch, lb | 3 |
| Shale inhibitor, lb | 4 |
| ROP Enhancer, lb | 6 |
| Caustic Soda, lb | 0.3 |
| HNP, lb | 6 |
| Bridging Agent, lb | 45 |
| Lignite, lb | 1 |
| Modified asphalt, lb | 4 |
| Cellulose, lb | 2 |
| Barite, lb | 160 |
| Simulated drill solids, lb | 9 |

Unexpectedly, it was observed that the nanoparticle additives of the present disclosure were capable of reducing filtrate against pore sizes that range from about 100 times to about 1000 times the size of the nanoparticle additive.

Example 2

Figure 4:
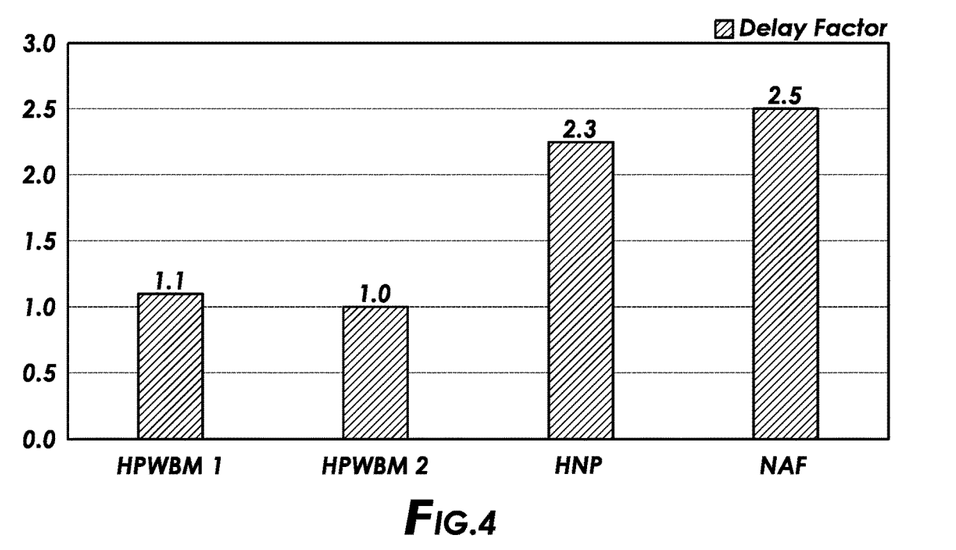
FIG. 4 is a graph illustrating data from pore pressure tests using various types of nanoparticle additives of the present disclosure.

A test was performed to measure the reduction in pore pressure transmission using the nanoparticle additives of the present disclosure. Measuring pore pressure transmission within a subterranean formation may be difficult. Accordingly, it may be advantageous to perform pore pressure testing in a controlled environment, such as a research laboratory. FIG. 4 shows the result of pore pressure transmission testing. In this test, four fluid formulations were pressurized against a shale sample. Two traditional fluid formulations and an HNP formulation of the present disclosure were prepared according to the formulations shown in Table 3 below.

TABLE 3

Fluid Formulations

|  | HPWBM 1 | HPWBM 2 | HNP |
| --- | --- | --- | --- |
| Freshwater, bbl | 0.87 | 0.84 | 0.83 |
| Potassium chloride, lb | 18 | 18 | 18 |
| Xanthan gum, lb | 1 | 1 | 0.9 |
| Polyanionic cellulose, lb | 2 | 2 | 2 |
| Shale Inhibitor 1, lb | 7 | 7 | 7 |
| Shale Inhibitor 2, lb | 1 | 1 | 1 |
| Shale Inhibitor 3, lb | — | 7 | — |
| Glycol, lb | — | 7 | — |
| HNP, lb | — | — | 10.5 |
| Potassium hydroxide, lb | 0.5 | 0.5 | 0.5 |
| Bridging agent, lb | 77 | 75 | 82 |

The pressure downstream of the shale sample was monitored as it increased over time to equilibrate the applied fluid pressure. Relative delay factors were calculated to compare the time required for pressure to transmit from the fluid through the shale sample. The fluid containing 10 lb/bbl of the nanoparticles gave delay times superior to other high performance WBMs and comparable to a high performance non-aqueous fluid. This nanoparticle fluid contained 3% KCl as well as polyanionic cellulose.

Example 3

A test was performed to measure the reduction in fluid loss using the nanoparticle additives of the present disclosure. A water-based mud was used as the base fluid for this test. Three separate test fluids were prepared to measure the synergistic effect of the nanoparticle additives of the present disclosure with biopolymer viscosifiers. The fluids were created per the formulations provided in Table 4 below.

TABLE 4

Fluid Formulations

|  | PAC Only | HNP Only | PAC + HNP |
| --- | --- | --- | --- |
| Freshwater, bbl | 0.83 | 0.83 | 0.83 |
| Xanthan gum, lb | 1.5 | 1.5 | 1.5 |
| Polyanionic cellulose, lb | 2.5 | — | 2.5 |
| Shale inhibitor, lb | 4 | 4 | 4 |
| Caustic Soda, lb | 0.3 | 0.3 | 0.3 |
| HNP, lb | — | 5 | 5 |
| Bridging agent, lb | 45 | 45 | 45 |
| Modified asphalt, lb | 4 | 4 | 4 |
| Barite, lb | 170 | 170 | 170 |

Figure 5:
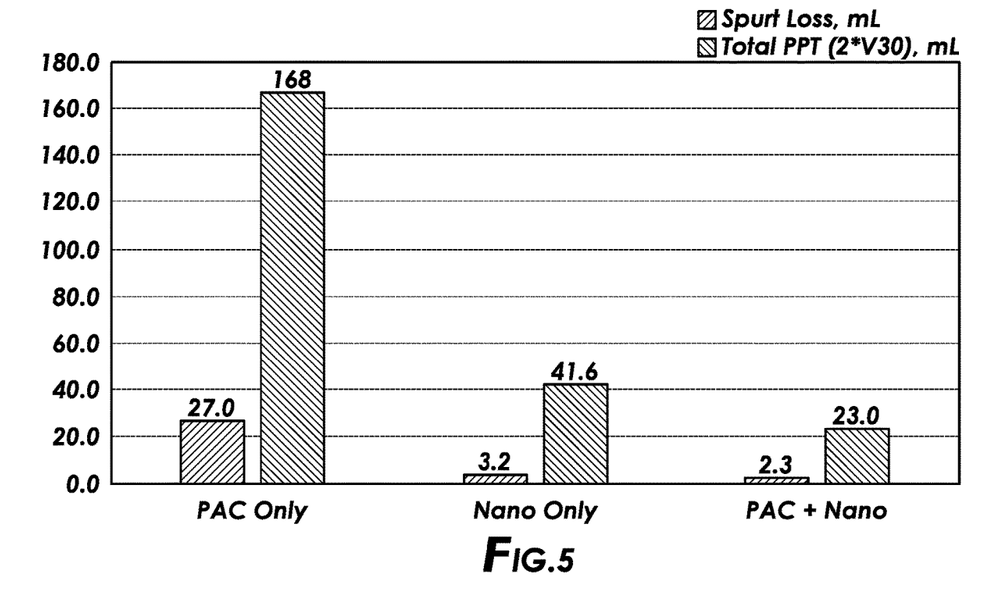
FIG. 5 is a graph illustrating data from pore pressure tests using various types of nanoparticle additives of the present disclosure.

FIG. 5 provides the results showing the improved performance of the treatment fluid with the nanoparticle additive and polyanionic cellulose as compared to a treatment fluid with only polyanionic cellulose and a treatment fluid with only the nanoparticle additive. FIG. 5 shows particle plug test data taken on a 10 μm disk with a differential pressure of 1000 psi at 180° F. Unexpectedly, it was observed that the combination of the nanoparticle additive and polyanionic cellulose obtained significantly greater fluid loss prevention than either the polyanionic cellulose or the nanoparticle additive alone.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid comprising an aqueous base fluid, a nanoparticle additive, a polyanionic cellulose, a bridging agent, a shale inhibitor, xanthan gum, and a salt, wherein the nanoparticle additive is present in the treatment fluid in an amount of about 5 lb/bbl, and wherein the polyanionic cellulose is present in an amount of about 2.5 lb/bbl of the treatment fluid;
   introducing the treatment fluid into at least a portion of a subterranean formation to contact at least a portion of the subterranean formation; and
   allowing the nanoparticle additive and polyanionic cellulose to reduce a pore pressure transmission,
   wherein the nanoparticle additive comprises a nanocomposite comprising a core and a shell,
   wherein the core comprises silica, and
   wherein the shell comprises a crosslinked copolymer shell comprising a copolymer of 2-acryloylamino-2-methyl-propane-1-sulfonic acid (AMPSA) and acrylamide.

2. The method of claim 1, further comprising allowing the nanoparticle additive to become incorporated into a filter cake located on a surface within the subterranean formation, wherein the nanoparticle additive provides enhanced fluid loss control to the filter cake and reduces fluid loss by about 30% to 70%, by measuring the reduction in High-Pressure High Temperature (HPHT) filtrate obtained from a particle plugging test run according to API RP 13B-1 against a 12 μm ceramic disc at 180° F. with 1000 psi differential pressure.

3. The method of claim 1, wherein the bridging agent is selected from calcium succinate, calcium maleate, magnesium tartrate, bismuth citrate, calcium carbonate, modified and unmodified starches, polyanionic cellulose, graphite, lignite, gilsonite, petroleum coke, derivatives thereof, or hydrates thereof.

4. The method of claim 1, wherein the treatment fluid further comprises a surfactant emulsifier.

5. A method comprising:
   providing a treatment fluid comprising an aqueous base fluid, a nanoparticle additive, xanthan gum, and a polyanionic cellulose, wherein the nanoparticle additive is present in an amount of about 5 lb/bbl, and wherein the polyanionic cellulose is present in an amount of about 2.5 lb/bbl of the treatment fluid;
   introducing the treatment fluid into at least a portion of a subterranean formation to contact at least a portion of the subterranean formation; and
   allowing the nanoparticle additive and polyanionic cellulose to reduce fluid loss into the subterranean formation,
   wherein the nanoparticle additive comprises a nanocomposite comprising a core and a shell,
   wherein the core comprises silica, and
   wherein the shell comprises a crosslinked acrylamide copolymer shell comprising a copolymer of 2-acryloylamino-2-methylpropane-1-sulfonic acid (AMPSA) and acrylamide.

6. The method of claim 5, wherein the treatment fluid further comprises a bridging agent.

7. The method of claim 5, wherein the treatment fluid does not comprise a bridging agent.

8. The method of claim 5, wherein the treatment fluid further comprises a shale inhibitor.

9. The method of claim 5, wherein the treatment fluid further comprises a surfactant emulsifier.

10. The method of claim 5, wherein the treatment fluid further comprises one or more salts.

11. A method comprising:
    providing a treatment fluid comprising an aqueous base fluid, a nanoparticle additive, xanthan gum, a polyanionic cellulose, a shale inhibitor, and a salt, wherein the nanoparticle additive is present in an amount of about 5 lb/bbl, and wherein the polyanionic cellulose is present in an amount of about 2.5 lb/bbl of the treatment fluid;

introducing the treatment fluid into at least a portion of a subterranean formation to contact at least a portion of the subterranean formation; and allowing the nanoparticle additive and polyanionic cellulose to reduce a pore pressure transmission, wherein the nanoparticle additive comprises a nanocomposite comprising a core and a shell, wherein the core comprises silica, and wherein the shell is substantially biodegradable and comprises a crosslinked acrylamide copolymer shell comprising a copolymer of 2-acryloylamino-2-methylpropane-1-sulfonic acid (AMPSA), and acrylamide.

12. The method of claim 11, wherein the treatment fluid further comprises a bridging agent.

13. The method of claim 12, wherein the bridging agent is selected from calcium succinate, calcium maleate, magnesium tartrate, bismuth citrate, calcium carbonate, modified and unmodified starches, polyanionic cellulose, graphite, lignite, gilsonite, petroleum coke, derivatives thereof, or hydrates thereof.

14. The method of claim 11, wherein the treatment fluid does not comprise a bridging agent.

15. The method of claim 11, wherein the treatment fluid further comprises a surfactant emulsifier.

16. The method of claim 11, wherein the shale inhibitor is selected from the group consisting of: an amine; an ethoxylated amine; a propoxylated amine; a Jeffamine; hexamethylenediamine; choline chloride; guanidine; a glycol; a polyalkylene glycol; a potassium salt; a silicate; a polymer of acrylamide; acrylic acid; a salt of acrylic acid; vinylpyrrolidone; a partially hydrolyzed polyacrylamide, polyvinylpyrrolidone, and copolymers of these polymers; and any combination thereof.

17. The method of claim 11, wherein the salt is selected from the group consisting of: potassium chloride, sodium chloride, potassium formate, potassium carbonate, calcium chloride, calcium bromide, and any combination thereof.

18. The method of claim 11, wherein the at least a portion of the subterranean formation comprises shale and wherein allowing the nanoparticle additive and polyanionic cellulose to reduce a pore pressure transmission further comprises increasing an amount of time required for pore pressure equilibration by about 1.5 times to about 2.5 times the amount of time required for a baseline fluid without the nanoparticle additive.

19. The method of claim 11, wherein the at least a portion of the subterranean formation comprises shale and wherein allowing the nanoparticle additive and polyanionic cellulose to reduce a pore pressure transmission further comprises lowering an equilibrium pressure by about 100 psi to about 500 psi.

20. The method of claim 18, wherein allowing the nanoparticle additive and polyanionic cellulose to reduce a pore pressure transmission further comprises lowering an equilibrium pressure by about 100 psi to about 500 psi.

* * * * *